United States Patent
Ban et al.

(10) Patent No.: US 7,929,999 B2
(45) Date of Patent: Apr. 19, 2011

(54) METHOD AND SYSTEM FOR HARNESSING PROCESSOR POWER OF MOBILE DEVICES

(75) Inventors: Oliver Keren Ban, Austin, TX (US);
Timothy Alan Dietz, Austin, TX (US);
Zhen Ning Hu, Shenzhen (CN);
Anthony Cappa Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 11/754,727

(22) Filed: May 29, 2007

(65) Prior Publication Data
US 2008/0300026 A1    Dec. 4, 2008

(51) Int. Cl.
H04M 1/00 (2006.01)
H04B 1/38 (2006.01)
H04B 7/00 (2006.01)
G06F 9/46 (2006.01)
G06F 15/16 (2006.01)
G06F 1/00 (2006.01)

(52) U.S. Cl. ........ 455/573; 455/522; 718/100; 718/102; 709/201; 709/219; 713/300

(58) Field of Classification Search .......... 718/100, 718/102; 709/201, 219; 713/300; 455/522, 455/573
See application file for complete search history.

(56) References Cited

U.S. PATENT DOCUMENTS

| | | | | |
|---|---|---|---|---|
| 6,463,457 B1 * | 10/2002 | Armentrout et al. | ......... | 709/201 |
| 6,498,454 B1 * | 12/2002 | Pinlam et al. | ............. | 320/107 |
| 7,036,034 B2 * | 4/2006 | Kobayashi et al. | ........... | 713/340 |
| 2002/0128001 A1 | 9/2002 | Shuttleworth | | |
| 2004/0203797 A1 | 10/2004 | Burr | | |
| 2006/0036880 A1 * | 2/2006 | Maezawa | ...................... | 713/300 |
| 2006/0101400 A1 * | 5/2006 | Capek et al. | .................. | 717/120 |
| 2008/0080411 A1 * | 4/2008 | Cole | ............................. | 370/328 |

OTHER PUBLICATIONS

Kurkovsky et al., "Wireless Grid Enables Ubiquitous Computing," Proceedings of the ISCA 16th International Conference on Parallel and Distributed Computing Systems, Aug. 13-15, 2003, Reno, Nevada, pp. 1-8. http://www.cs.ccsu.edu/~stan/research/Grid/Pubs/PDCS2003.pdf.

Chu et al., "Mobile OGSI.NET: Grid Computing on Mobile Devices," Proceedings of the 5th IEEE/ACM International Workshop on Grid Computing (associated with Supercomputing 2005), Pittsburgh, PA, Nov. 8, 2004, pp. 1-10. http://www.cs.virginia.edu/~humphrey/papers/MobileOGSI.pdf.

LeBrun et al., "VGrid: Vehicular AdHoc Networking and Computing Grid for Intelligent Traffic Control," 2004, pp. 1-2. http://www.ece.ucdavis.edu/~chuah/paper/ucd-swoc04-VGRID.pdf.

Agarwal et al., "Wireless Grids: Approaches, Architectures, and Technical Challenges," MIT Sloan School of Management, Working Paper 4459-04, Jan. 2004, pp. 1-9. http://wirelessgrids.net/docs/SSRN_ID489782_code285952.pdf.

\* cited by examiner

Primary Examiner — Marivelisse Santiago-Cordero
(74) Attorney, Agent, or Firm — Yee & Associates, P.C.; Steven L. Bennett

(57) ABSTRACT

A system for utilizing the processing power of a mobile device. It is determined whether an energy source within the mobile device is recharging. In response to determining that the energy source within the mobile device is recharging, it is determined whether the mobile device is sending or receiving transmissions. In response to determining that the mobile device is not sending or receiving transmissions, a task is requested from a server via a network. In response to receiving the task from the server, the task is routed to a processor of the mobile device to process the task and return a task result. Then, the task result is sent to the server via the network.

18 Claims, 2 Drawing Sheets

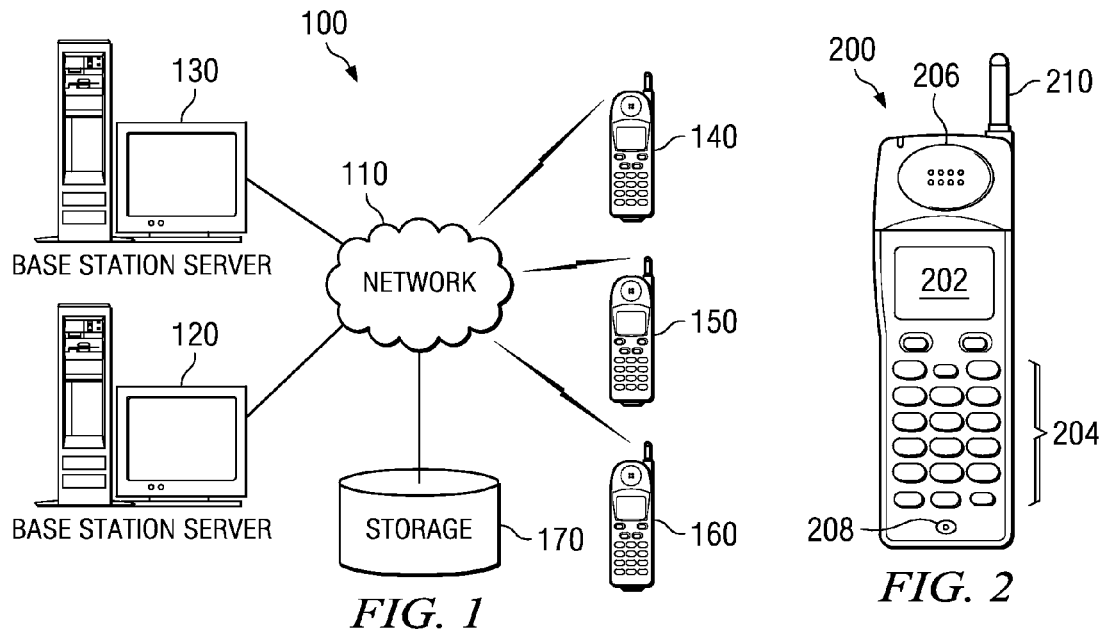
FIG. 1
FIG. 2
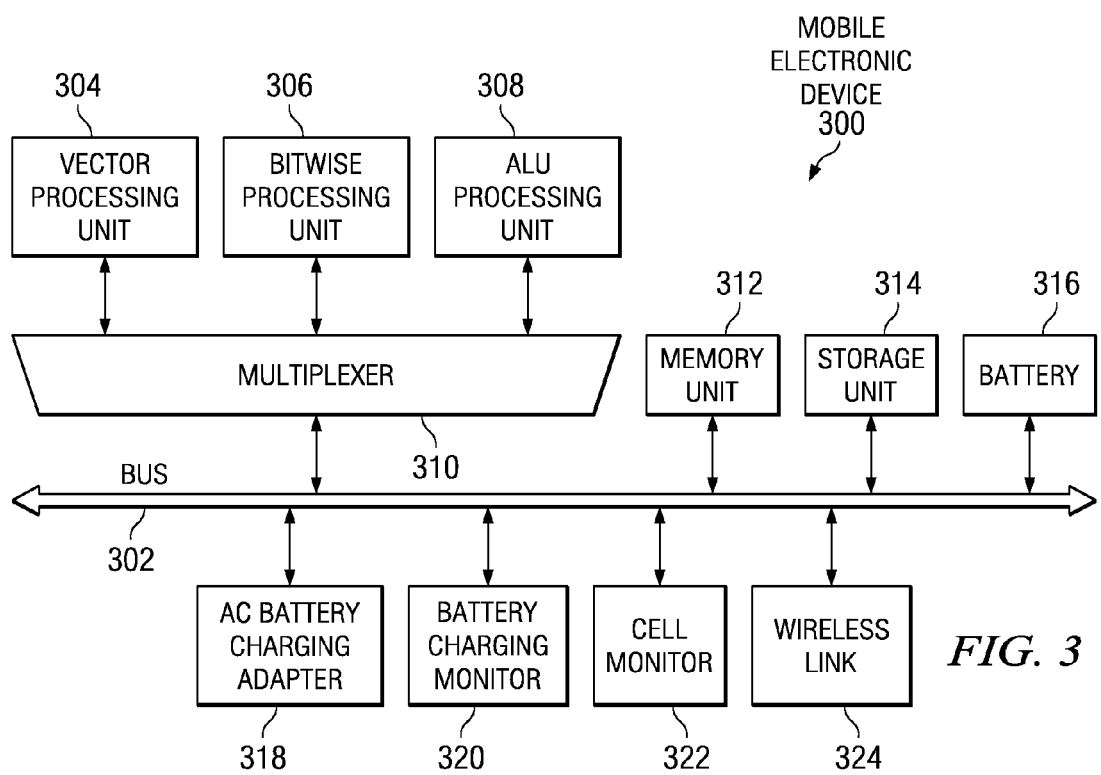
FIG. 3

METHOD AND SYSTEM FOR HARNESSING PROCESSOR POWER OF MOBILE DEVICES

BACKGROUND OF THE INVENTION

1. Field of the Invention

The present invention relates generally to an improved data processing system. More specifically, the present invention is directed to a computer implemented method, system, and computer usable program code for utilizing the processing power of a plurality of mobile electronic devices within a network to perform grid computational tasks.

2. Description of the Related Art

Today, computer systems are becoming increasingly pervasive in our society. These pervasive computer systems include small handheld mobile electronic devices, such as cellular telephones and personal data assistants (PDAs). With increasing power and functionality, these mobile electronic devices now contain significant amounts of computing power. Thus, these mobile electronic devices have evolved into more of a powerful computing platform, instead of just a signal processor.

Typically, the duty cycle of these mobile electronic devices is quite small, focusing on brief, on-demand activities, such as sending and receiving voice or text messages. Statistically, most processing units within these mobile electronic devices are utilized less than five percent of the operational time. Consequently, the total possible computing power of these mobile electronic devices is vastly under utilized. Furthermore, these mobile electronic devices are likely to become ubiquitous and via "always on" connections, these mobile electronic devices may become accessible to a global network of other devices. However, currently there is no good method for harnessing this under utilized computing power of mobile electronic devices and thus, this computing power is wasted.

Therefore, it would be beneficial to have an improved computer implemented method, system, and computer usable program code for utilizing the processing power of a plurality of mobile electronic devices within a network to perform distributed computational tasks.

BRIEF SUMMARY OF THE INVENTION

Illustrative embodiments provide a computer implemented method, system, and computer usable program code for utilizing the processing power of a mobile device. It is determined whether an energy source within the mobile device is recharging. In response to determining that the energy source within the mobile device is recharging, it is determined whether the mobile device is sending or receiving transmissions. In response to determining that the mobile device is not sending or receiving transmissions, a task is requested from a server via a network. In response to receiving the task from the server, the task is routed to a processor of the mobile device to process the task and return a task result. Then, the task result is sent to the server via the network.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a pictorial representation of a mobile electronic device in which illustrative embodiments may be implemented;

FIG. 3 is a block diagram of a mobile electronic device in accordance with an illustrative embodiment;

DETAILED DESCRIPTION OF THE INVENTION

Figure 4:
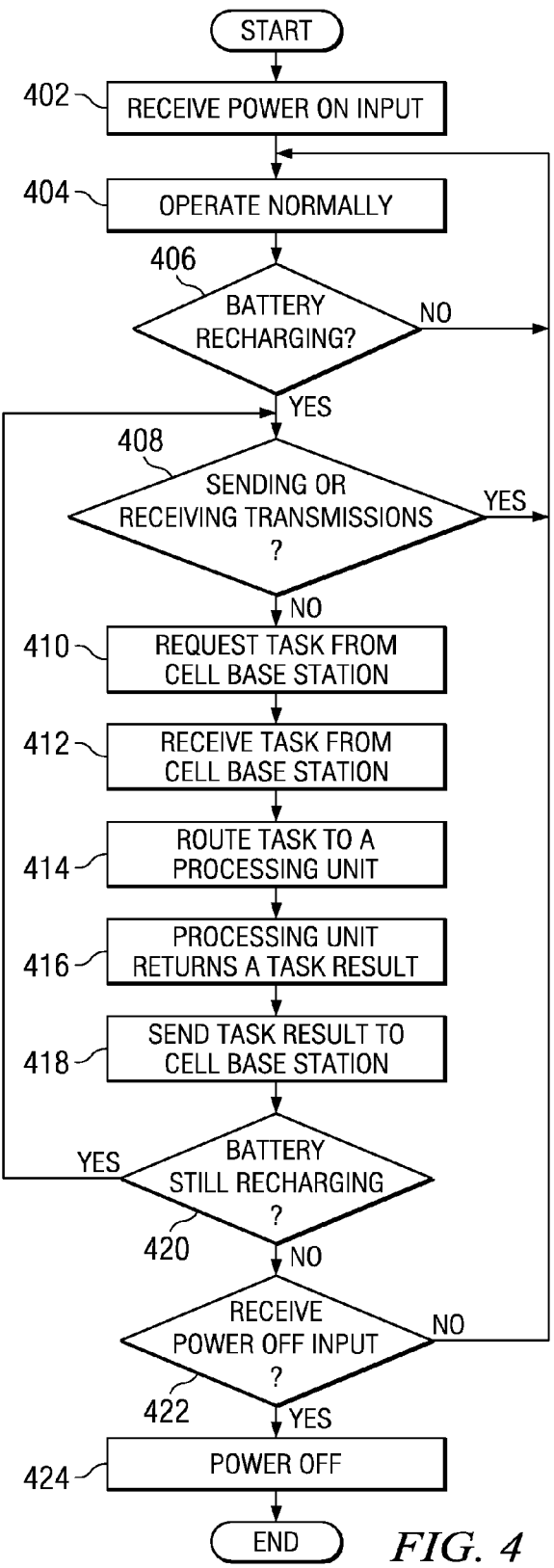
FIG. 4 is a flowchart illustrating an exemplary process for utilizing the processing power of a mobile electronic device to perform computational tasks in accordance with an illustrative embodiment.

With reference now to the figures, FIG. 1 depicts a pictorial representation of a network of data processing systems in which illustrative embodiments may be implemented. Network data processing system 100 is a network of computers in which illustrative embodiments may be implemented. Network data processing system 100 contains network 110, which is the medium used to provide communication links between various computers and other devices coupled together within network data processing system 100. Network 110 may include several types of connections, such as wire, wireless communication links, or fiber optic cables. However, for this illustrative embodiment depicted in FIG. 1, wireless communication links are emphasized.

In the depicted example of FIG. 1, base station server 120 and base station server 130 are coupled to network 110 by wire or wireless communication links. Base station servers 120 and 130 may, for example, be communication servers with high speed connections to network 110. Also, base station servers 120 and 130 may represent a plurality of communication servers located within a local area network (LAN) or a wide area network (WAN). Further, base station servers 120 and 130 may, for example, reside within a cellular telephone service provider (SP) network. In another illustrative embodiment, base station servers 120 and 130 may, for example, independently or in combination provide communication services for a plurality of cellular telephone SP networks.

Mobile electronic devices 140, 150, and 160 are coupled to network 110 via wireless means. In addition, mobile electronic devices 140, 150, and 160 are clients to base station servers 120 and 130. In this illustrative example, mobile electronic devices 140, 150, and 160 are cellular telephones relying on wireless communication links.

However, it should be noted that besides being cellular telephones, the mobile electronic devices shown in FIG. 1 may, for example, be PDAs, handheld gaming devices, handheld computers, or laptop computers that rely on wireless communication links. Furthermore, illustrative embodiments are not restricted to the above-listed mobile electronic devices. Illustrative embodiments may utilize any mobile electronic device that is capable of accomplishing processes of illustrative embodiments.

Storage unit 170 also is coupled to network 110 and represents any type of storage device that is capable of storing data in a structured and/or unstructured format. Also, storage unit 170 may represent a plurality of storage units coupled to network 110. Storage unit 170 may, for example, be a database for a cellular telephone SP network that contains customer information, such as customer names, addresses, telephone numbers, and personal profile data.

Further, storage unit 170 also may contain one or more grid computational tasks from one or more entities, such as governmental agencies, educational institutions, research institutes, and businesses. A grid computational task is a task or job that is computationally intensive and is distributed among a plurality of mobile electronic devices, such as mobile electronic devices 140, 150, and 160, within a communication grid, such as network 110, for processing. However, mobile electronic devices 140, 150, and 160 may only receive a small portion or block of the computational task at one time. Furthermore, storage 170 may store the completed portions or blocks of a task until the entire task is finished by mobile electronic devices 140, 150, and 160. Moreover, base station server 120 and/or base station server 130 may aggregate the completed portions of the task and perform further computations on the data, if necessary.

Additionally, network data processing system 100 may, for example, include additional servers, clients, storage units, and other devices not shown. Moreover, network data processing system 100 may, for example, represent the Internet with network 110 representing a worldwide collection of networks and gateways that use the transmission control protocol/internet protocol (TCP/IP) suite of protocols to communicate with one another. Internet protocol (IP) telephony is the two-way transmission of voice over a packet-switched IP network, which is part of the TCP/IP suite of protocols. The terms "IP telephony" and "voice over IP" (VoIP) are synonymous. VoIP is a telephone service that uses the Internet as a global telephone network. At the heart of the Internet is a backbone of high-speed data communication lines between major nodes or host computers, consisting of thousands of commercial, government, educational, and other computer systems that route data and messages.

It should be appreciated by those of ordinary skill in the art that FIG. 1 is only intended as an exemplary illustration and is not intended as an architectural limitation for illustrative embodiments. Further, it should be appreciated by those of ordinary skill in the art that even though the example of FIG. 1 depicts a cellular telephone network, illustrative embodiments may be utilized by any type of wireless/mobile system.

With reference now to FIG. 2, a pictorial representation of a mobile electronic device is depicted in which illustrative embodiments may be implemented. In the illustrative example of FIG. 2, mobile electronic device 200 is a cellular telephone. Mobile electronic device 200 may, for example, be mobile electronic device 140 in FIG. 1. However, illustrative embodiments may utilize any type of wirelessly enabled mobile electronic device, such as a PDA, a hand-held computer, a hand-held gaming device, or a laptop computer, to accomplish processes of illustrative embodiments.

Mobile electronic device 200 includes display 202 to present textual and graphical information to a user. Display 202 may be a known display device, such as a liquid crystal display (LCD) or an organic light-emitting diode (OLED) display. Mobile electronic device 200 also includes keypad 204, speaker 206, and microphone 208. A user may utilize keypad 204 to enter telephone numbers, user identification information, and commands for interacting with the interface. Mobile electronic device 200 may present audio feedback via speaker 206. A user may utilize microphone 208 not only for voice communication, but also for entering specific voice commands for voice actuated functions. Further, mobile electronic device 200 uses antenna 210 to establish wireless communication links with a network, such as, for example, network 110 in FIG. 1. However, it should be noted that even though antenna 210 is shown as an external antenna, antenna 210 may represent an internal antenna as well.

Illustrative embodiments provide a computer implemented method, system, and computer usable program code for utilizing the processing power of a mobile electronic device, such as a cellular telephone. The mobile electronic device is one of a plurality of mobile electronic devices within a network. The mobile electronic device determines if an energy source, such as a battery, within the mobile device is recharging. In response to determining that the energy source within the mobile device is recharging, the mobile electronic device determines if the mobile electronic device is sending or receiving transmissions. In response to determining that the mobile device is not sending or receiving transmissions, the mobile electronic device uses, for example, a cell monitor to request a computational task from a base station server via the network. In response to receiving the computational task from the base station server, the mobile electronic device uses, for example, a multiplexer to route the computational task to one of a plurality of processors within the mobile electronic device to process the task and to receive a task result. Then, the mobile electronic device sends the task result to the base station server via the network.

Thus, the processing units of a plurality of mobile electronic devices in a cellular (wireless/mobile) system are multiplexed in a cohesive way, so that parallel processing occurs during periods of battery charging, which enables grid computing using the plurality of mobile electronic devices. Each mobile electronic device uses a battery charging monitor to determine when the computational power of the mobile electronic device may be used. A cell base station server downloads a portion or a block of a grid computation task to the mobile electronic device for processing only during a battery charging period. During the battery charging period, when the mobile electronic device is not in a talking or messaging mode, the mobile electronic device routes all input and output through the multiplexer. The multiplexer routes the downloaded computational task to an appropriate processor, such as, for example, a vector processing unit, a bitwise processing unit, or an arithmetic logic unit (ALU) processing unit, for processing depending upon the specific task. The mobile electronic device may process further computational tasks, as long as the mobile electronic device remains in the battery charging mode and no voice or text messages are sent or received.

In general, a cellular telephone network divides a geographical area of service into cells. Each cell includes a base station that uses wireless transmission technologies to provide services to mobile users in its area. A computational grid may be defined as an application of resources of several computing devices on a network towards solving a single problem at the same time. The computational grid is used to share the processing power of these many computing devices that may, for example, be interconnected by a TCP/IP based network.

When a mobile electronic device enters a cell, the mobile electronic device may, for example, register itself with and inform the cell base station server about its characteristics, such as computational power, amount of available resources, and types of tasks that the mobile electronic device is capable of solving. Knowledge of such characteristics may enable the base station server to allocate specific portions of computationally intensive tasks to the mobile electronic device for processing. In addition, each mobile electronic device may, for example, periodically inform the cell base station server about their presence within the cell, their current workload, and progress towards obtaining a solution, if any.

As a result, illustrative embodiments are able to harness the under utilized computing power of mobile electronic devices coupled to a wireless network to perform computationally intensive tasks for one or more entities. Because illustrative embodiments only use the processing power of a mobile electronic device during a battery charging cycle when the mobile electronic device is connected to an alternating current (AC) power source, the battery of the mobile electronic device is not harmed and battery energy is not drained during performance of these computationally intensive tasks. Hence, illustrative embodiments manage power utilization of mobile electronic devices connected to the network, while at the same time harnessing the unused computational processing power of those mobile electronic devices.

With reference now to FIG. 3, a block diagram of a mobile electronic device is depicted in accordance with an illustrative embodiment. In the illustrative example of FIG. 3, mobile electronic device 300 may, for example, be implemented in mobile electronic device 200 in FIG. 2. However, it should be noted that illustrative embodiments may be implemented in any type of wirelessly enabled mobile electronic device, such as a cellular telephone, a PDA, a hand-held computer, a hand-held gaming device, or a laptop computer, to accomplish processes of illustrative embodiments.

In the illustrative example of FIG. 3, mobile electronic device 300 utilizes a bus architecture, such as bus 302. Bus 302 may include one or more buses. In addition, bus 302 may be implemented using any type of communication fabric or architecture that provides for a transfer of data between the different components or devices coupled to bus 302.

Mobile electronic device 300 includes vector processing unit 304, bitwise processing unit 306, ALU processing unit 308, multiplexer 310, memory unit 312, storage unit 314, battery 316, AC battery charging adapter 318, battery charging monitor 320, cell monitor 322, and wireless link 324, which are connected to bus 302. However, it should be noted that mobile electronic device 300 is only shown for exemplary purposes and is not meant as an architectural limitation to illustrative embodiments. Mobile electronic device 300 may include more or fewer components as necessary to perform processes of illustrative embodiments.

Vector processing unit 304, bitwise processing unit 306, and ALU processing unit 308 provide the data processing capabilities of mobile electronic device 300. An operating system runs on one or more of these processing units and coordinates and provides control of various components within mobile electronic device 300. In addition, software applications executing on electronic device 300 may run in conjunction with the operating system.

Multiplexer 310 is a multiplexing unit. Mobile electronic device 300 uses multiplexer 310 to receive a computational task from a cell base station server, such as, for example, base station server 120 in FIG. 1. After receiving the computational task, multiplexer 310 selects an appropriate processing unit to process the computational task. For example, if the computational task requires arithmetic computations, then multiplexer 310 selects and sends the computational task to ALU processing unit 308 or if the computational task requires vector computations, then multiplexer 310 selects and sends the computational task to vector processing unit 308. Subsequent to the selected processor receiving and processing the computational task, the processor sends a result of the computational task back to multiplexer 310. Then, multiplexer 310 sends the task result to the cell base station server for aggregation of task results and further computation, if necessary.

Storage unit 314 is a non-volatile storage device that may, for example, be configured as read only memory (ROM) and/or flash ROM to provide the non-volatile memory for storing the operating system, applications, and/or user-generated data. Storage unit 314 also stores instructions or computer usable program code for the operating system, applications, and illustrative embodiments. The instructions are loaded into memory unit 312 for execution by vector processing unit 304, bitwise processing unit 306, and/or ALU processing unit 308. Vector processing unit 304, bitwise processing unit 306, and/or ALU processing unit 308 perform processes of illustrative embodiments by executing the computer usable program code that is loaded into memory unit 312.

However, it should be noted that mobile electronic device 300 may store data in a remote storage device, such as, for example, storage 170 in FIG. 1, in addition to or instead of storage unit 314. In addition, storage unit 314 may contain any data necessary for processes of illustrative embodiments to provide real time processing power to perform grid computational tasks by a plurality of processing units within a mobile electronic device.

Mobile electronic device 300 utilizes battery 316 to supply power to mobile electronic device 300 when mobile electronic device 300 is not connected to an AC power source. Battery 316 may be any type of battery for supplying power to mobile electronic device 300. In addition, mobile electronic device 300 uses AC battery charging adapter 318 to recharge battery 316 when mobile electronic device 300 is connected to an AC power source. Further, mobile electronic device 300 utilizes battery charging monitor 320 to determine when battery 316 is in a charging mode. When battery 316 is in a charging mode and mobile electronic device 300 is not sending or receiving transmissions, mobile electronic device 300 uses cell monitor 322 to send a request to the cell base station server for a computational task. Cell monitor 322 remains in almost constant communication with the cell base station server.

Wireless link 324 may, for example, utilize shortwave, high frequency, ultra high frequency, microwave, wireless fidelity (Wi-Fi™), Bluetooth® technology, or any other wireless communication means to establish a wireless communication link for mobile electronic device 300. Mobile electronic device 300 also may rely on wireless application protocol (WAP) for facilitating communications. Wireless application protocol is a standard for providing wireless phones, pagers, and other handheld devices with secure access to e-mail and text-based Web pages. Wireless application protocol provides a complete environment for wireless applications that includes a wireless counterpart of TCP/IP and a framework for telephony integration, such as call control and phone book access. Wireless application protocol features the wireless markup language (WML), which was derived from Phone.com's handheld device markup language (HDML) and is a streamlined version of hypertext markup language (HTML) for small screen displays. Also, wireless application protocol uses WMLScript, a compact JavaScript-like language that runs in limited memory. Additionally, wireless application protocol supports handheld input methods, such as keypad and voice recognition.

Wireless application protocol runs over all the major wireless networks now in place. Also, wireless application protocol is device independent, requiring only a minimum functionality in the unit so that it may be used with a myriad of cellular phones and handheld devices. However, it should be pointed out that wireless application protocol has been described for illustrative purposes, and other wireless protocols may be used to implement illustrative embodiments.

Furthermore, it should be noted that a user of mobile electronic device 300 may enable and disable processes of illustrative embodiments independently of other mobile electronic device 300 functions and features. Moreover, it should be noted that processes of illustrative embodiments may be implemented entirely as software, hardware, or as a combination of software and hardware components.

Those of ordinary skill in the art will appreciate that the components depicted in FIG. 3 may vary depending on implementation of illustrative embodiments. Other internal components or peripheral devices may be used in addition to or in place of the components shown in FIG. 3. For example, mobile electronic device 300 also may include a voice recognition system in order to perform functions activated by user voice command.

With reference now to FIG. 4, a flowchart illustrating an exemplary process for utilizing the processing power of a mobile electronic device to perform computational tasks is shown in accordance with an illustrative embodiment. The process shown in FIG. 4 may be implemented in a mobile electronic device, such as, for example, mobile electronic device 300 in FIG. 3.

The process begins when the mobile electronic device receives a user input to power on (step 402). After receiving the user input to power on in step 402, the mobile electronic device powers on and operates normally (step 404). Subsequently, the mobile electronic device uses a battery charging monitor, such as, for example, battery charging monitor 320 in FIG. 3, to determine whether a battery, such as, for example, battery 316 in FIG. 3, is recharging (step 406).

If the battery is not recharging, no output of step 406, then the process returns to step 404 where the mobile electronic device continues to operate normally. If the battery is recharging, yes output of step 406, then the mobile electronic device makes a determination as to whether the mobile electronic device is sending or receiving transmissions, such as voice, text, or multimedia messages (step 408). If the mobile electronic device is sending or receiving transmissions, yes output of step 408, then the process returns to step 404 where the mobile electronic device continues to operate normally. If the mobile electronic device is not sending or receiving transmissions, no output of step 408, then the mobile electronic device uses a cell monitor, such as, for example, cell monitor 322 in FIG. 3, to request a computational task from a cell base station, such as, for example, base station server 120 in FIG. 1, via a network, such as, for example, network 110 in FIG. 1 (step 410).

Afterward, the mobile electronic device uses a multiplexer, such as, for example, multiplexer 310 in FIG. 3, to receive the task from the cell base station (step 412). Subsequent to receiving the task in step 412, the multiplexer routes the task to an appropriate processing unit, such as, for example, vector processing unit 304 in FIG. 3, for processing depending upon the specific task received (step 414). After processing the task, the processing unit returns a task result to the multiplexer (step 416).

Then, the multiplexer sends the task result to the cell base station for aggregation with other task results for the same computational task (step 418). Subsequently, the mobile electronic device uses the battery charging monitor to determine if the battery is still recharging (step 420). If the battery is still recharging, yes output of step 420, then the process returns to step 408 where the mobile electronic device makes a determination as to whether the mobile electronic device is sending or receiving transmissions. If the battery is not recharging, no output of step 420, then the mobile electronic device makes a determination as to whether the mobile electronic device receives a user input to power off (step 422).

If the mobile electronic device does not receive a user input to power off, no output of step 422, then the process returns to step 404 where the mobile electronic device continues to operate normally. If the mobile electronic device does receive a user input to power off, yes output of step 422, then the mobile electronic device powers off (step 424). The process terminates thereafter.

Figure 5:
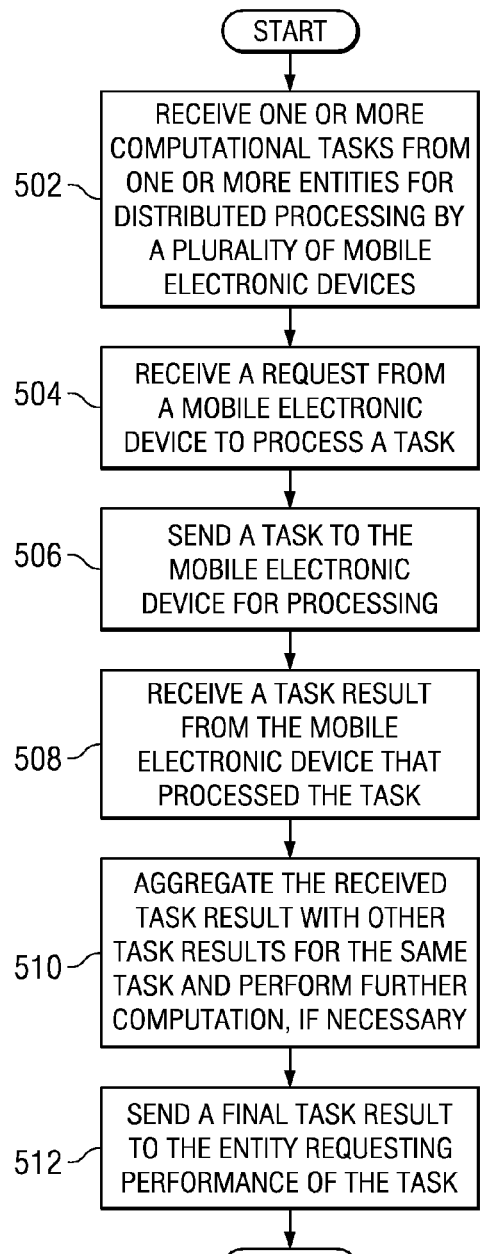
FIG. 5 is a flowchart illustrating an exemplary process for distributing computational tasks to a plurality of mobile electronic devices in accordance with an illustrative embodiment.

With reference now to FIG. 5, a flowchart illustrating an exemplary process for distributing computational tasks to a plurality of mobile electronic devices is shown in accordance with an illustrative embodiment. The process shown in FIG. 5 may be implemented in a cell base station server, such as, for example, base station server 120 in FIG. 1.

The process begins when the cell base station server receives one or more computational tasks from one or more entities for distributed processing by a plurality of mobile electronic devices, such as, for example, mobile electronic devices 140, 150, and 160 in FIG. 1, which are coupled to a network, such as, for example, network 110 in FIG. 1 (step 502). Subsequently, the cell base station server receives a request from a mobile electronic device within the plurality of mobile electronic devices to process a task (step 504). It should be noted that the mobile electronic device will not request a task unless the mobile electronic device's battery, such as, for example, battery 316 in FIG. 3, is in a charging mode and the mobile electronic device is not sending or receiving transmissions, such as voice or text messages.

After receiving the request for a task from the mobile electronic device, the cell base station server sends a task to the mobile electronic device for processing (step 506). It should be noted that the task is only a portion, or a block, of an entire task that is distributed among the plurality of mobile electronic devices coupled to the network. Subsequently, the cell base station server receives a task result from the mobile electronic device that processed the task (step 508). Then, the cell base station server aggregates the received task result with other task results for the same task and performs further computations, if necessary (step 510). Afterward, the cell base station server sends a final task result to the entity requesting performance of the task (step 512). The process terminates thereafter.

Thus, illustrative embodiments provide a computer implemented method, system, and computer usable program code for utilizing the processing power of a plurality of mobile electronic devices within a wireless network to perform computational tasks during recharging cycles. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters also may be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for utilizing the processing power of a mobile device, the computer implemented method comprising:
   determining if an energy source within the mobile device is recharging;
   responsive to determining that the energy source within the mobile device is recharging, determining if the mobile device is sending or receiving transmissions;
   responsive to determining that the mobile device is not sending or receiving transmissions, requesting a task from a server via a network, wherein the mobile device only requests the task if the energy source is in charging mode and the mobile device is not sending or receiving voice or text messages;
   responsive to receiving the task from the server, routing the task to a processor of the mobile device, wherein the processor processes the task and returns a task result; and
   sending the task result to the server via the network.

2. The computer implemented method of claim 1, further comprising:
   responsive to determining that the energy source within the mobile device is not recharging, continuing normal operation of the mobile device.

3. The computer implemented method of claim 1, wherein the mobile device is a cellular telephone.

4. The computer implemented method of claim 1, wherein the mobile device is at least one of a personal digital assistant or laptop computer wirelessly enabled.

5. The computer implemented method of claim 1, wherein the processor is one of a plurality of processors within the mobile device.

6. The computer implemented method of claim 5, wherein the mobile device uses a multiplexer to route the task to an appropriate processor within the plurality of processors.

7. The computer implemented method of claim 1, wherein the energy source is a battery.

8. The computer implemented method of claim 7, wherein the mobile device uses a battery charging monitor to determine if the battery is recharging.

9. The computer implemented method of claim 1, wherein the server aggregates the task result with other task results for a same task to form a final task result.

10. The computer implemented method of claim 1, wherein the task is only a portion of an entire task other portions of which are distributed among a plurality of mobile electronic devices coupled to the network.

11. The computer implemented method of claim 1, wherein the network is a wireless network.

12. A data processing system for utilizing the processing power of a mobile device, comprising:
    a bus system;
    a storage device connected to the bus system, wherein the storage device includes a set of instructions; and
    a processing unit connected to the bus system, wherein the processing unit executes the set of instructions to determine if an energy source within the mobile device is recharging, determine if the mobile device is sending or receiving transmissions in response to determining that the energy source within the mobile device is recharging, request a task from a server via a network in response to determining that the mobile device is not sending or receiving transmissions, wherein the mobile device only requests the task if the energy source is in charging mode and the mobile device is not sending or receiving voice or text messages, route the task to a processor of the mobile device to process the task and return a task result in response to receiving the task from the server, and send the task result to the server via the network.

13. The data processing system of claim 12, wherein the processing unit executes a further set of instructions to continue normal operation of the mobile device in response to determining that the energy source within the mobile device is not recharging.

14. The data processing system of claim 12, wherein the mobile device is a cellular telephone.

15. A computer program product for utilizing the processing power of a mobile device, the computer program product comprising:
    a non-transitory computer readable medium having computer readable program code embodied therein, the non-transitory computer readable medium comprising:
    computer readable program code configured to determine if an energy source within the mobile device is recharging;
    computer readable program code configured to determine if the mobile device is sending or receiving transmissions in response to determining that the energy source within the mobile device is recharging;

computer readable program code configured to request a task from a server via a network in response to determining that the mobile device is not sending or receiving transmissions, wherein the mobile device only requests the task if the energy source is in charging mode and the mobile device is not sending or receiving voice or text messages;

computer readable program code configured to route the task to a processor of the mobile device to process the task and return a task result in response to receiving the task from the server; and computer readable program code configured to send the task result to the server via the network.

16. The computer program product of claim 15, further comprising: computer readable program code configured to continue normal operation of the mobile device in response to determining that the energy source within the mobile device is not recharging.

17. The computer program product of claim 15, wherein the processor is one of a plurality of processors within the mobile device.

18. The computer program product of claim 17, wherein the mobile device uses a multiplexer to route the task to an appropriate processor within the plurality of processors.

* * * * *